Figure 1:
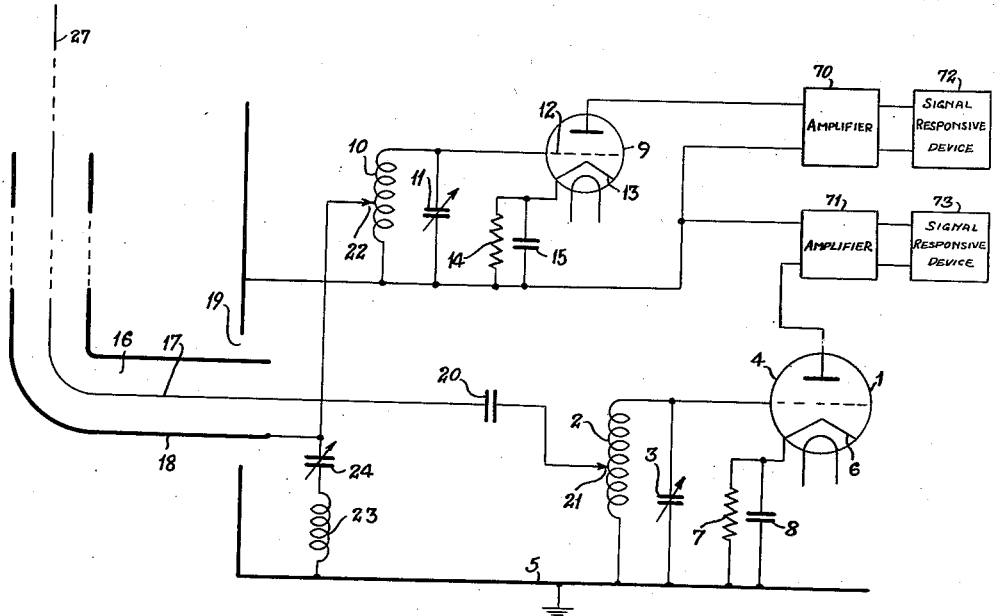

Oct. 19, 1937.　　　E. C. CORK ET AL　　　2,096,031
AERIAL SYSTEM
Filed Aug. 17, 1935　　　3 Sheets-Sheet 1

Inventors:
E. C. CORK,
A. D. BLUMLEIN,
E. L. C. WHITE
By: J. Oppenheimer, atty.

Patented Oct. 19, 1937

2,096,031

UNITED STATES PATENT OFFICE 2,096,031

AERIAL SYSTEM

Edward Cecil Cork and Alan Dower Blumlein, Ealing, London, and Eric Lawrence Casling White, Hillingdon, Middlesex, England, assignors to Electric & Musical Industries Limited, Hayes, England, a company of Great Britain Application August 17, 1935, Serial No. 36,610
In Great Britain August 17, 1934

23 Claims. (Cl. 250—33)

The present invention relates to aerial systems.

In short wave reception an aerial is often connected to a receiver by means of a feeder which may comprise one insulated conductor and one conductor earthed at one or more points along its length. The feeder often comprises a conductor arranged centrally of and insulated from an earthed sheath.

In many cases it is required to receive short and long wave signals simultaneously. For example, it may be desired to receive television signals on a short wave length and the accompanying sound on a medium or long wave length. Hitherto it has been necessary to employ two aerials for this purpose.

It is an object of the present invention to enable long or medium wave signals to be received simultaneously with short wave signals, without the provision of a separate aerial.

According to the present invention there is provided a wireless receiving system adapted for the simultaneous reception of waves of a relatively short wave length and waves of a longer wave length, the system comprising a short wave aerial coupled by means of a feeder to short wave receiving apparatus, wherein a part or the whole of said feeder is so arranged and so coupled to a receiver for said longer wave length that it can operate as an aerial for said longer wave length receiver.

According to a feature of the present invention there is provided a wireless receiving system for simultaneous reception of waves of a relatively short wave length and waves of a longer wave length, the system comprising a short wave aerial coupled by means of a feeder consisting of at least two conductors to short wave receiving apparatus, said feeder being so connected that short wave signals are transferred therealong substantially in phase opposition on two of said conductors, one or more of said conductors being insulated from earth and being so arranged and so coupled to a receiver for said longer wave length that it can operate as an aerial for said longer wave length receiver.

The invention further provides a wireless receiving system adapted for simultaneous reception of waves of a relatively short wave length and waves of a longer wave length, the system comprising a feeder having two conductors, the feeder being associated at one end with a short wave aerial and at the other end having one conductor connected to means whereby this conductor is effectively earthed at a short wave length and is effectively insulated from earth at a longer wave length.

Figure 2:
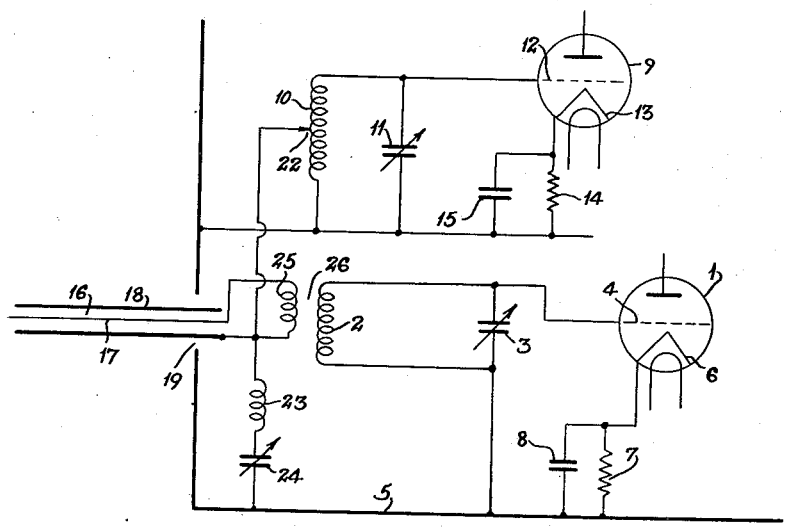
Figure 3:
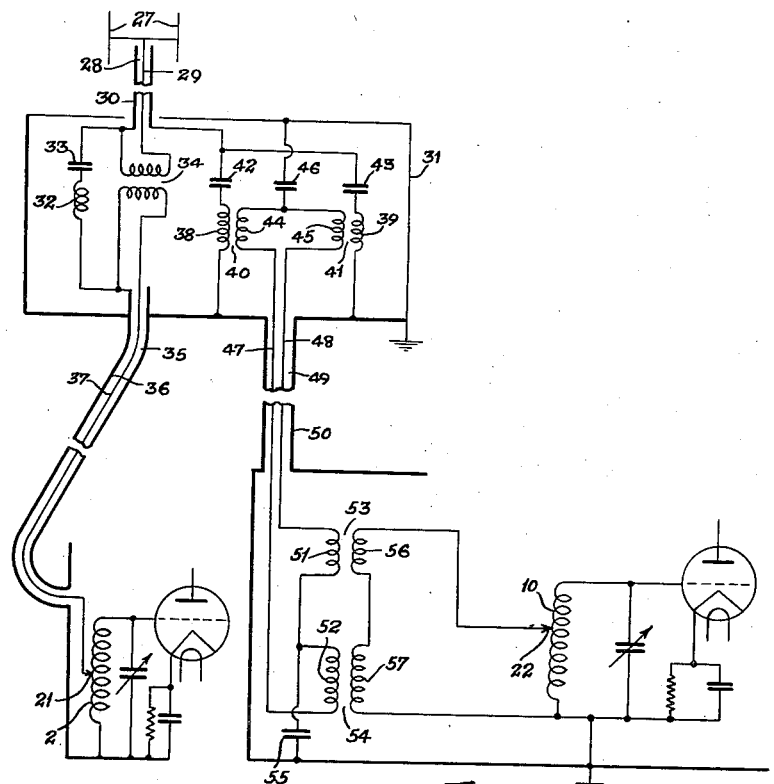
Figure 4:
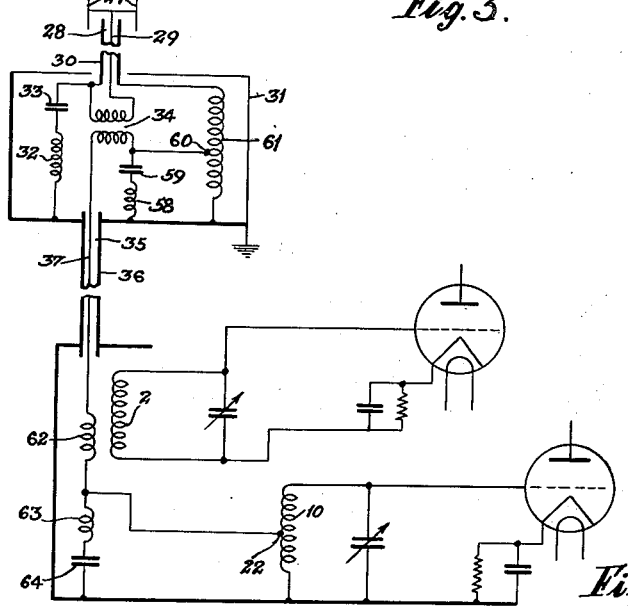
Figure 5:
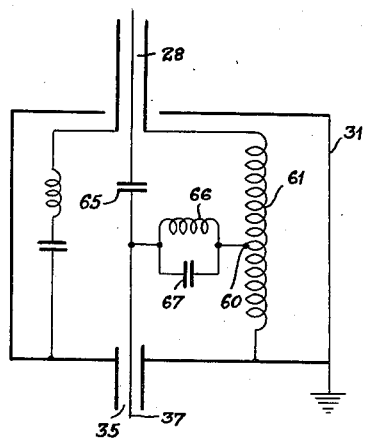
Figure 6:
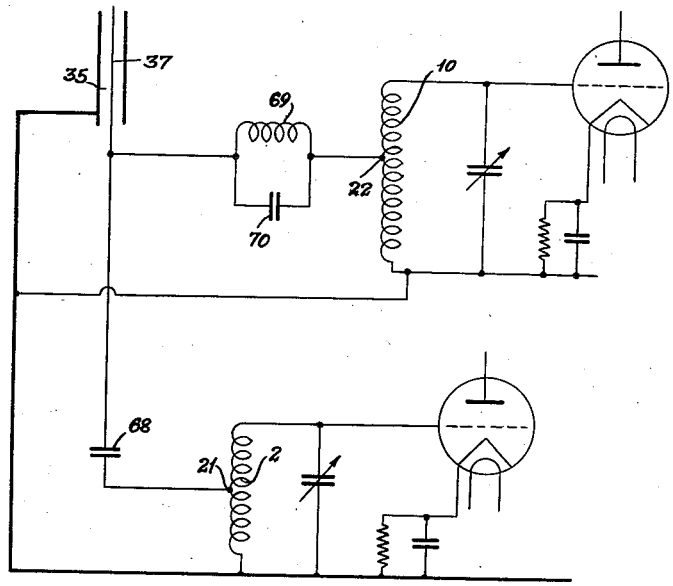

The invention will be described by way of example with reference to the accompanying diagrammatic drawings, wherein Fig. 1 shows an arrangement according to the present invention, Fig. 2 shows a modification of a part of Fig. 1, Fig. 3 shows a further modification of a part of Fig. 1, Fig. 4 shows a modification of Fig. 3 and Figs. 5 and 6 show modifications of parts of Fig. 4.

Referring to Fig. 1 of the drawings, the first valve 1 of a short wave wireless receiver has a parallel tuned circuit, tunable to a short wave length and comprising an inductance 2 in parallel with a variable condenser 3, connected between its control grid 4 and the earthed metal chassis 5 of the receiver. The cathode 6 of valve 1 is connected to the chassis 5 through a bias resistance 7 shunted by a decoupling condenser 8.

The first valve 9 of a medium wave receiver is mounted on the same chassis 5 and has a parallel tuned circuit, tunable to a medium wave length and comprising an inductance 10 in parallel with a variable condenser 11, connected between its grid 12 and the chassis 5. The cathode 13 of valve 9 is also connected to the chassis through a bias resistance 14 shunted by a decoupling condenser 15.

A feeder 16 comprising a conductor 17 arranged centrally within a cylindrical sheath 18 is associated at one end with a short wave aerial 27. The other end of the feeder projects through an aperture 19 in the receiver chassis 5. The central conductor 17 is connected through a coupling condenser 20 of small capacity to a tapping point 21 on the inductance 2 in the short wave parallel tuned circuit 2, 3.

The sheath 18 of feeder 16 is connected to a tapping point 22 on the inductance 10 in the longer wave parallel tuned circuit 10, 11 and is also connected to the chassis 5 through a series tuned circuit, tunable to a short wave length and comprising an inductance 23 in series with a variable condenser 24. No direct connection exists between the sheath 18 and either the chassis 5 or earth.

Both the series short wave circuit 23, 24 and the parallel short wave circuit 2, 3 are tuned to the frequency of the carrier of television signals to be received. The series tuned circuit 23, 24 has a low impedance at its resonant frequency and the coupling condenser 20 between the central conductor 17 and the tapping point 21 on the inductance 2 in the short wave parallel tuned circuit 2, 3 has a low impedance to signals at short wave lengths. At the short wave length to which the circuits 2, 3 and 23, 24 are tuned the sheath 18 is therefore effectively earthed through the series tuned circuit 2, 3 and the central conductor is connected through a connection of low impedance to the tapping point 21 on the inductance 2 in the short wave parallel tuned circuit 2, 3 and therefore signals of this wave length appearing across the receiver end of the feeder are passed, with little attenuation, to the parallel tuned circuit 2, 3 and thence to the first valve 1 of the short wave section of the receiver.

At frequencies corresponding to medium or long wave-lengths the impedance of the series tuned circuit 23, 24 approximates that of the condenser 24 in this circuit and is high because this condenser is of low capacity. The sheath 18 is therefore effectively insulated from earth for these waves. The sheath 18 thus acts as an aerial and signals appearing between the lower end of the sheath and earth are applied across a part of the inductance 10 of the medium wave tuned circuit 10, 11 which circuit is tuned to the frequency of the carrier of the sound signals. The required signals therefore appear across the tuned circuit 10, 11 and are applied to the grid 12 of the first valve 9 of the medium wave section of the receiver.

The two valves 1, 9 are themselves arranged to detect the incoming signals and the modulations, after suitable amplification in amplifiers denoted by 70, 71, are fed to suitable signal responsive devices denoted by 72 and 73. Thus the television signals may be fed to a picture reproducer, such as a cathode ray tube, and the sound signals may be fed to a loudspeaker.

The coupling condenser 20 is inserted in the lead between the central conductor 17 and the tapping point 21 on the inductance 2 in the short wave parallel tuned circuit 2, 3 in order to increase the impedance between the central conductor 17 and earth at the lower carrier frequency. Were condenser 20 omitted the capacity between the two elements 17, 18 of the feeder 16 would effectively earth the outer conductor 18 at the lower frequency, since the impedance between the tapping point 21 on the short wave inductance 2 and earth is small at this frequency.

In Fig. 2, transformer coupling is employed between the feeder 16 and the short wave parallel tuned circuit 2, 3 of the short wave section of the receiver. Condenser 20 of Fig. 1 is omitted and a coil 25 is connected between the ends of the conductors 17, 18 of feeder 16. Coil 25 is arranged to constitute the primary winding of a transformer 26 of which inductance 2 constitutes the secondary winding. In other respects Fig. 2 is similar to Fig. 1, like references being used to denote like parts.

In some cases it may be inconvenient for the medium or long wave aerial to terminate at the receiver. For example, the receiver may be situated at a point subject to electrical interference from neighbouring electrical apparatus. In such a case an aerial terminating at the receiver is liable to pick up interference which will mar reception. It is then desirable to arrange that the aerial is located at a point which is remote from the receiver and which is not subject to electrical interference, the aerial being connected to the receiver by a screened feeder.

One arrangement whereby this result can be obtained is illustrated in Fig. 3. A short wave aerial 27 is connected to one end of a concentric feeder 28 comprising a central conductor 29 and a sheath 30. The other end of feeder 28 terminates within a coupling device arranged within an earthed metal box 31. The sheath 30 is insulated from the box 31 but is effectively connected thereto at the short wave length to be received by means of a series resonant circuit 32, 33 tuned to this wave length. A transformer 34 serves to couple feeder 28 to another concentric feeder 35, the sheath 36 of which is earthed and the central conductor 37 being connected at one end to transformer 34 and at the other end to tapping point 21 on inductance 2 of the short wave receiver. Feeders 28 and 35 may be considered as constituting a single feeder which connects aerial 27 to the input of the short wave receiver, a coupling device 31 being included at a point in this single feeder. The primary windings 38, 39 of two step-down transformers 40, 41 are connected at one end to earth and at the other end through condensers 42, 43 to the sheath 30 of feeder 28. The secondary windings 44, 45 of transformers 40, 41 are connected in series, their common point being connected to earth through a condenser 46. The free ends of secondary windings 44, 45 are connected to two conductors 47, 48 of a further feeder 49 which is provided with an earthed sheath 50. Feeder 49 is coupled at its other end to the input of the medium or long wave receiver, conductors 47 and 48 being connected to the primary windings 51, 52 (arranged in series) of two step-up input transformers 53, 54. The common point of the primary windings 51, 52 is earthed through a condenser 55 and the secondary windings 56, 57 of transformers 53, 54 are connected in series and between earth and tapping point 22 on inductance 10. In other respects the arrangement of Fig. 3 is similar to that of Fig. 1.

In the arrangement of Fig. 3 short wave signals are picked up by aerial 27, fed through feeder 28, the sheath of which is effectively earthed at these high frequencies by the series resonant circuit 32, 33, transferred by transformer 34 to feeder 35 and thereby passed on to the input of the short wave receiver. Sheath 30 of feeder 28 is effectively insulated from earth for medium and long wave lengths and therefore sheath 30 and aerial 27 together form a medium or long wave length aerial. Signals picked up by this aerial are passed by one of the transformers 40, 41 to feeder 49 and thence through one of transformers 53, 54 to the input of the longer wave receiver. It is preferably arranged that one transformer of each of the pairs of transformers 40, 41 and 53, 54 is operative over one wave band (e. g. 250 to 600 metres) the other two transformers being operative over another wave band (e. g. 1000 to 2000 metres). If it is only desired to operate over one of these wave bands one transformer at each end of feeder 49 may be removed. In this case only a single core is required in feeder 49.

It will be seen that, by suitably locating the box 31 and by providing suitable lengths of feeders 35 and 49 to connect it to the receiver, both the short wave aerial 27 and the long wave aerial 27, 30 may be remote from the receiver and may therefore be arranged so that they avoid local electrical interference.

Fig. 4 shows a modification of Fig. 3. In the case of Fig. 4 only a single concentric feeder is used to connect the box 31 to the two receivers. Transformers 40, 41, 53, 54, the associated condensers 42, 43, 46, 55, and feeder 49 of Fig. 3 are not employed in the arrangement of Fig. 4. In this case neither end of the secondary winding of transformer 34 is directly connected to box 31 but one end is effectively earthed at the operating short wave length through a series tuned circuit 58, 59. The common point of this tuned circuit and the secondary winding of transformer 34 is connected to the tapping point 60 of a step-down auto-transformer 61 connected between sheath 30 and earth.

In the receiver, the primary winding 62 of a short wave transformer, of which inductance 2 forms the secondary winding, and a further short wave series tuned circuit 63, 64 are connected in series between conductor 37 and earth. The common point of series circuit 63, 64 and winding 62 is connected to tapping point 22 on inductance 10 of the medium or long wave receiver.

It will be seen that with this arrangement the two sets of signals are fed in series to feeder 35, and at the receiver end of this feeder the signals excite their respective receivers.

In a modification shown in Fig. 5 of the box 31 of Fig. 4, transformer 34 and series circuit 58, 59 are replaced by a condenser 65 coupling conductor 29 to conductor 37 and a short wave parallel tuned circuit 66, 67 connected between conductor 37 and tapping point 60 of auto-transformer 61. In this case the two sets of signals are fed in parallel to feeder 35, the high impedance of the parallel tuned circuit 66, 67 at the operating short wave length serving to prevent transfer of currents of this frequency between conductor 37 and auto-transformer 61. At the longer wave length the impedance of this circuit is low and it serves to feed current from auto-transformer 61 to conductor 37.

An arrangement similar to that of Fig. 5 may be employed for separating the signals at the receiver, this arrangement being shown in Fig. 6 in which conductor 37 is connected through a condenser 68 to tapping point 21 on inductance 2 of the short wave receiver, and also, through a parallel tuned circuit 69, 70 tuned to the operating short wave length, to tapping point 22 on inductance 10 of the long wave receiver.

Although particular arrangements of the invention have been described with reference to television reception the invention is limited neither to these arrangements nor to television reception. Many other arrangements and applications of the invention will be apparent to those versed in the art.

The invention is also applicable to short wave aerials not using a concentric feeder. For example, it is sometimes arranged that the short wave aerial is connected to one of a pair of wires acting as a feeder. The other wire (not connected to the aerial), is usually earthed and acts as a "counterpoise" to prevent signals being picked up by the feeder. Such a system may be used according to this invention by insulating and connecting the counterpoise in the manner suggested for the sheath of the concentric feeder.

Similarly, the invention may be applied to a balanced short wave feeder. Such a feeder may consist of two wires connected in symmetrical fashion to a short wave aerial and running adjacently to a receiver where they are connected to the primary of a short wave transformer feeding the signals to the receiver. With such an arrangement according to this invention, the centre point of the transformer primary, instead of being connected to earth or chassis, may be connected to a medium or short wave receiver. For medium or short waves the two conductors then operate in parallel as an aerial. If desired, the centre point of the transformer primary may be held at earth potential for short waves by means of a series tuned circuit.

We claim:

1. A wireless receiving system comprising a short wave aerial, a short wave receiving apparatus, a feeder permanently coupling said short wave aerial to said short wave receiving apparatus, a longer wave length receiver and means for permanently coupling at least a part of said feeder to said longer wave length receiver to constitute an aerial therefor, whereby energy may be received by both of said receivers simultaneously.

2. A wireless receiving system comprising a short wave aerial, a short wave receiving apparatus, a feeder comprising at least two conductors, means for feeding signals received by said aerial to two of said conductors substantially in phase opposition, a circuit permanently coupled to said short wave receiver and to said feeder for feeding said signals from said feeder to said short wave receiving apparatus, a longer wave length receiver and means for permanently coupling at least a part of said feeder to said longer wave length receiver to constitute an aerial therefor, whereby energy may be received by both of said receivers simultaneously.

3. A wireless receiving system comprising a short wave aerial, a short wave receiving apparatus, a feeder comprising a first conductor insulated from earth and a second conductor, means for feeding signals received by said aerial to said conductors substantially in phase opposition, a circuit permanently coupled to said feeder and said short wave receiving apparatus for feeding said signals from said feeder to said short wave receiving apparatus, a longer wave length receiver and means for permanently coupling said first conductor to said longer wave length receiver to constitute an aerial therefor.

4. A wireless receiving system comprising a short wave aerial, a short wave receiving apparatus, a feeder comprising a first conductor and a second conductor, said second conductor coupling said short wave aerial to said short wave receiving apparatus, means for effectively earthing said first conductor at a short wave length and effectively insulating said first conductor from earth at a longer wave length, a longer wave length receiver and means for coupling said first conductor to said longer wave length receiver to constitute an aerial therefor.

5. A wireless receiving system comprising a short wave aerial, a short wave receiving apparatus, a feeder comprising a first conductor and a second conductor, said second conductor coupling said short wave aerial to said short wave receiving apparatus, means comprising a series resonant circuit tuned to a short wave length and connected between said first conductor and earth for effectively earthing said first conductor at a short wave length and effectively insulating said first conductor from earth at a longer wave length, a longer wave length receiver and means for coupling said first conductor to said longer wave length receiver to constitute an aerial therefor.

6. A wireless receiving system comprising a short wave aerial, a short wave receiving apparatus, a feeder permanently coupling said short wave aerial to said short wave receiving apparatus, a longer wave length receiver and means for permanently coupling a part of said feeder remote from said short wave receiving apparatus to said longer wave length receiver to constitute an aerial therefor.

7. A wireless receiving system comprising a short wave aerial, a short wave receiving apparatus, a feeder permanently coupling said short wave aerial to said short wave receiving apparatus, a longer wave length receiver located adjacent said short wave receiving apparatus and means for permanently coupling a part of said feeder remote from said short wave receiving apparatus to said longer wave length receiver to constitute an aerial therefor.

8. A wireless receiving system comprising a short wave aerial, a short wave receiving apparatus, a feeder permanently coupling said short wave aerial to said short wave receiving apparatus, a longer wave length receiver located adjacent said short wave receiving apparatus and means comprising a further feeder for permanently coupling a part of said feeder remote from said short wave receiving apparatus to said longer wave length receiver to constitute an aerial therefor.

9. A wireless receiving system comprising a short wave aerial, a short wave receiving apparatus, a first section of feeder permanently coupled to said aerial and extending therefrom to a point intermediate said aerial and said receiving apparatus, a second section of feeder permanently coupled to both said first section and to said receiving apparatus, a longer wave length receiver and means for permanently coupling said first section of feeder to said longer wave length receiver to constitute an aerial therefor, said means including said second section of feeder.

10. A wireless receiving system comprising a short wave aerial, a short wave receiving apparatus, a feeder in the form of an inner conductor and a sheath coupling said short wave aerial to said short wave receiving apparatus, a longer wave length receiver and means for coupling the sheath of said feeder to said longer wave length receiver to constitute an aerial therefor, whereby energy may be received by both said receiving apparatus simultaneously.

11. A wireless receiving system in accordance with claim 1, characterized in this that said feeder is a concentric line whose inner conductor is coupled to said short wave receiving apparatus and whose outer conductor is coupled to said longer wave length apparatus.

12. A wireless receiving system comprising a short wave aerial, a short wave receiving apparatus, a feeder comprising a first conductor and a second conductor coupling said short wave aerial to said short wave receiving apparatus, means comprising the series combination of a variable condenser of low capacity and an inductance for effectively earthing said first conductor at a short wave length and effectively insulating said first conductor from earth at a longer wave length, a longer wave length receiver and means for coupling said first conductor to said longer wave length receiver to constitute an aerial therefor.

13. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection from said sheath to a tapping point intermediate the ends of said second inductance coil, and a connection including a coupling condenser between said inner conductor and a tapping point intermediate the ends of said first inductance coil, whereby said sheath is effectively earthed at the short waves and effectively insulated from earth at the longer waves to be received.

14. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection from said sheath to a tapping point intermediate the ends of said second inductance coil, and an electromagnetic connection between said feeder and said first inductance coil, said last connection comprising an inductance coil conductively coupled to said inner conductor and said sheath.

15. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection from said sheath to a tapping point intermediate the ends of said second inductance coil, and an electromagnetic connection between said feeder and said first inductance coil, said last connection comprising an inductance coil conductively coupled to said inner conductor and said sheath and including a substantially concentric feeder whose inner conductor connects to a tapping point intermediate the ends of said first inductance coil and whose outer conductor is grounded.

16. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection including a pair of step-down transformers from said sheath to a tapping point intermediate the ends of said second inductance coil, and an electromagnetic connection between said feeder and said first inductance coil, said last connection comprising an inductance coil conductively coupled to said inner conductor and said sheath.

17. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection from said sheath to a tapping point intermediate the ends of said second inductance coil, said connection including a step-down transformer, a section of line and a step-up transformer in the order named.

18. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to ground, a connection from said sheath to a tapping point intermediate the ends of said second inductance coil, and a connection including a coupling condenser between said inner conductor and a tapping point intermediate the ends of said first inductance coil, said coupling condenser having a low impedance to the short wave energy, whereby said sheath is effectively earthed at the short waves and effectively insulated from earth at the longer waves to be received.

19. A radio receiving system comprising a feeder having an inner conductor and a surrounding sheath, short wave receiving apparatus including a parallel tuned input circuit of an inductance coil and condenser tunable to the short wave energy to be received over said feeder, a longer wavelength receiving apparatus including a parallel tuned input circuit of an inductance coil and a condenser tunable to the longer wave to be received over said feeder, a chassis at a relatively fixed radio frequency potential containing said short and longer wave receiving apparatus, said feeder being physically separated from said chassis, a series resonant circuit within said chassis, said series resonant circuit being tuned to the short wave energy to be received and coupling said sheath to said chassis, a connection from said sheath to a tapping point intermediate the ends of said second inductance coil, and a connection including a coupling condenser between said inner conductor and a tapping point intermediate the ends of said first inductance coil, said coupling condenser having a low impedance to the short wave energy.

20. A radio receiving system comprising a feeder having an inner conductor and a surrounding sheath, short wave receiving apparatus including a parallel tuned input circuit of an inductance coil and condenser tunable to the short wave energy to be received over said feeder, a longer wavelength receiving apparatus including a parallel tuned input circuit of an inductance coil and a condenser tunable to the longer wave to be received over said feeder, a series resonant circuit tuned to the short wave energy to be received coupling said sheath to a point of relatively fixed radio frequency potential, a direct connection from said sheath to a tapping point intermediate the ends of said second inductance coil, and an electromagnetic connection between said feeder and said first inductance coil, said last connection comprising an inductance coil conductively coupled to said inner conductor and said sheath.

21. A radio receiving system comprising a feeder having an inner conductor and a surrounding sheath, short wave receiving apparatus including a parallel tuned input circuit of an inductance coil and condenser tunable to the short wave energy to be received over said feeder, a longer wave length receiving apparatus including a parallel tuned input circuit of an inductance coil and a condenser tunable to the longer wave to be received over said feeder, a series resonant circuit tuned to the short wave energy to be received coupling said sheath to a point of relatively fixed radio frequency potential, an electromagnetic connection from said sheath to a tapping point intermediate the ends of said second inductance coil and an electromagnetic connection between said feeder and said first inductance coil, said last connection comprising an inductance coil conductively coupled to said inner conductor and said sheath.

22. A wireless receiving system comprising a short wave aerial, a short wave receiving apparatus, a feeder comprising a first conductor and a second conductor, said second conductor coupling said short wave aerial to said short wave receiving apparatus, means comprising a series resonant circuit tuned to a short wavelength and connected between said first conductor and earth for effectively earthing said first conductor at a short wave length and effectively insulating said first conductor from earth at a longer wave length, a longer wave length receiver and means for directly coupling said first conductor to said longer wavelength receiver to constitute an aerial therefor.

23. A wireless receiving system comprising a short wave aerial, a short wave receiving apparatus, a feeder comprising a first conductor and a second conductor, said second conductor coupling said short wave aerial to said short wave receiving apparatus, means comprising a series resonant circuit tuned to a short wavelength and connected between said first conductor and earth for effectively earthing said first conductor at a short wave length and effectively insulating said first conductor from earth at a longer wave length, a longer wave length receiver and means for electromagnetically coupling said first conductor to said longer wave length receiver to constitute an aerial therefor.

EDWARD CECIL CORK.
ALAN DOWER BLUMLEIN.
ERIC LAWRENCE CASLING WHITE.